United States Patent
Malvestio

[11] Patent Number: 6,152,269
[45] Date of Patent: Nov. 28, 2000

[54] INTEGRATED UNIT FOR THE PARKING AND SERVICE BRAKING OF ROTATING PARTS

[75] Inventor: Luciano Malvestio, Villanova di Camposampiero, Italy

[73] Assignee: Carraro S.p.A., Padua, Italy

[21] Appl. No.: 09/176,209

[22] Filed: Oct. 21, 1998

[30] Foreign Application Priority Data

Oct. 22, 1997 [IT] Italy .................................. PD97A0231

[51] Int. Cl.[7] ................................................. F16D 65/14
[52] U.S. Cl. .................. 188/106 P; 188/71.6; 188/71.8; 188/72.3; 188/264 F
[58] Field of Search ................................ 188/71.7, 71.2, 188/71.8, 72.1, 72.3, 71.5, 71.6, 106 P, 106 F, 170, 264 E, 264 D

[56] References Cited

U.S. PATENT DOCUMENTS

| | | |
|---|---|---|
| 4,057,297 | 11/1977 | Beck et al. .............................. 188/72.3 |
| 4,077,500 | 3/1978 | Hickman, Sr. et al. ............. 188/106 P |
| 4,346,791 | 8/1982 | Cumming ................................ 188/71.5 |
| 4,624,353 | 11/1986 | Sailer et al. ........................ 188/264 D |
| 4,893,879 | 1/1990 | Middlehoven et al. ................. 188/170 |
| 4,947,966 | 8/1990 | Huff ........................................ 188/170 |
| 5,174,420 | 12/1992 | DeWald et al. ........................ 188/71.5 |

*Primary Examiner*—Michael Mar
*Assistant Examiner*—Mariano Sy
*Attorney, Agent, or Firm*—Sughrue, Mion, Zinn, Macpeak & Seas, PLLC

[57] ABSTRACT

In a braking unit of the SAHR type comprising a braking pack with disks and counter-disks, a resilient system for compressing the pack with a braking load sufficient for parking braking, a first hydraulic system for exerting on the resilient system a contrary load sufficient to cancel out its effect, a second hydraulic system acting on the pack to compress it with a braking load sufficient for service braking, both hydraulic systems share a single piston acting on one side on the pack and on the other side on the resilient system.

10 Claims, 4 Drawing Sheets

INTEGRATED UNIT FOR THE PARKING AND SERVICE BRAKING OF ROTATING PARTS

SUMMARY OF THE INVENTION

The subject of the present invention is an integrated unit for the parking and service braking of rotating parts, particularly, but not exclusively, designed for application at the final transmission of an axle for vehicles.

Such a unit is known for example from U.S. Pat. No. 4,947,966.

These units are indicated in the relevant technical field by the abbreviation SAHR (Spring Apply Hydraulic Release) and are able to provide a resilient system capable of exerting on a pack of disks and counter-disks a braking load sufficient for parking braking, a first hydraulic system for exerting on the resilient system a contrary load sufficient to cancel out the action thereof, and a second hydraulic system capable of exerting on the pack a braking load sufficient for service braking.

In practice, with the engine switched off, the brake is actuated by the resilient load of one or more springs. The said load is cancelled out by the thrust of a hydraulic pressure piston with the engine running and brake deactivated, while another pressure piston provides a thrust equal to that of the springs for service braking, at the same time cancelling out the thrust of the first pressure cylinder, counter to the springs.

These known braking units are valued for their operation but have some drawbacks. For example, they generally exhibit a certain complexity of construction and assembly, and moreover require the provision of separate hydraulic circuits for the actuation, and respectively the lubrication, of the brake.

SUMMARY OF THE INVENTION

The problem on which the present invention is based is that of perfecting a braking unit structurally and functionally designed so as to make it possible to overcome the drawbacks described with reference to the prior art which has been cited.

One object of the invention is to produce an SAHR braking unit which permits a prompt braking response even in difficult situations.

A further object of the invention is to provide a structure in which it is simple to integrate systems for taking up the play resulting from wear of the friction surfaces.

Yet another object of the invention is to provide the structure of the braking unit with devices capable of improving its safety in operation.

This problem and these objects are addressed and solved, according to the invention, by a braking unit produced in accordance with the claims which follow.

BRIEF DESCRIPTION OF THE DRAWINGS

The characteristics and advantages of the invention will become clear from the following detailed description of one of its preferred embodiments provided by way of nonlimiting example with reference to the appended drawings, in which.

DETAILED DESCRIPTION OF THE INVENTION

Figure 1:
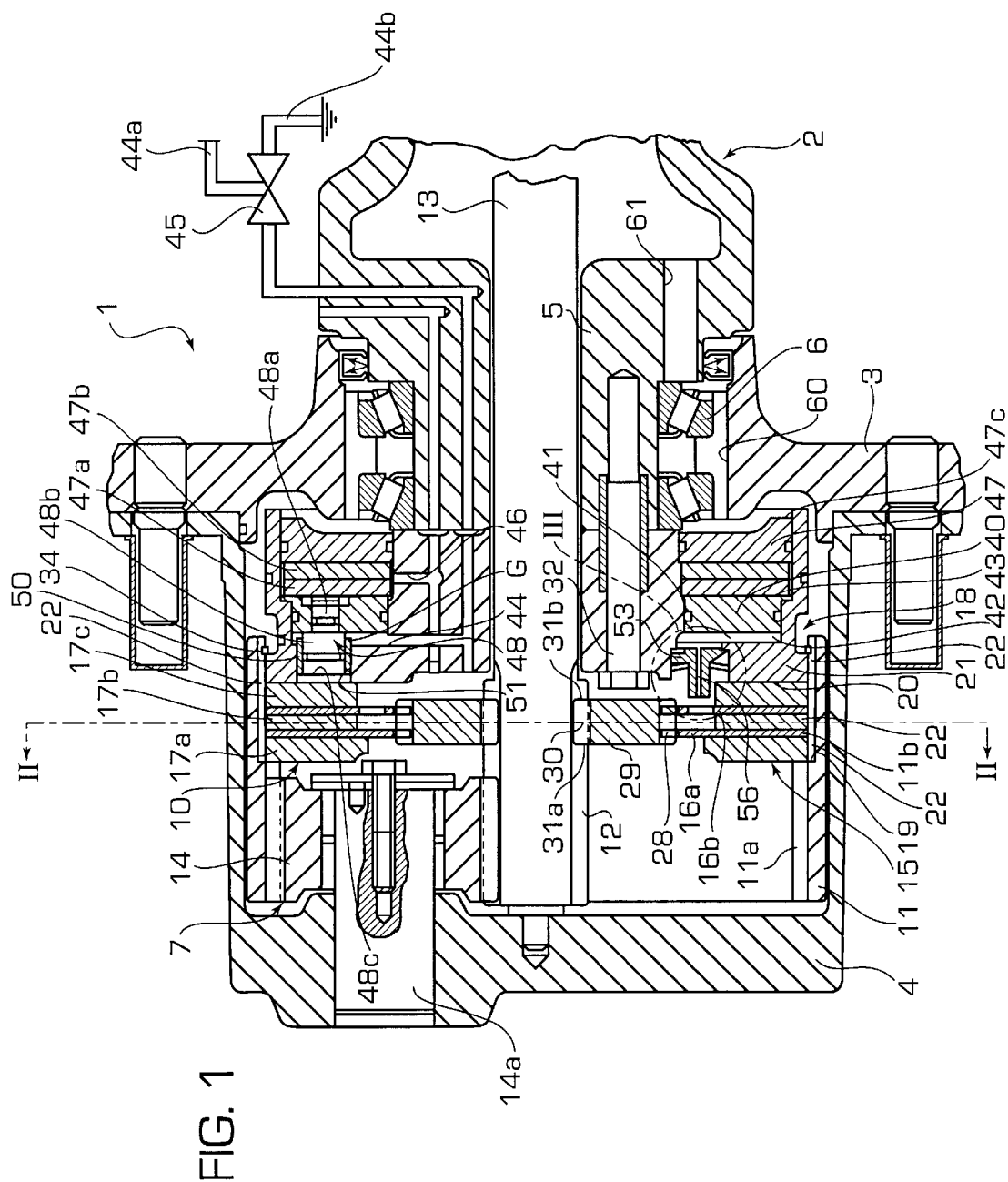
FIG. 1 is a partial view in longitudinal section of a transmission for vehicles incorporating a braking unit according to the invention.
Figure 2:
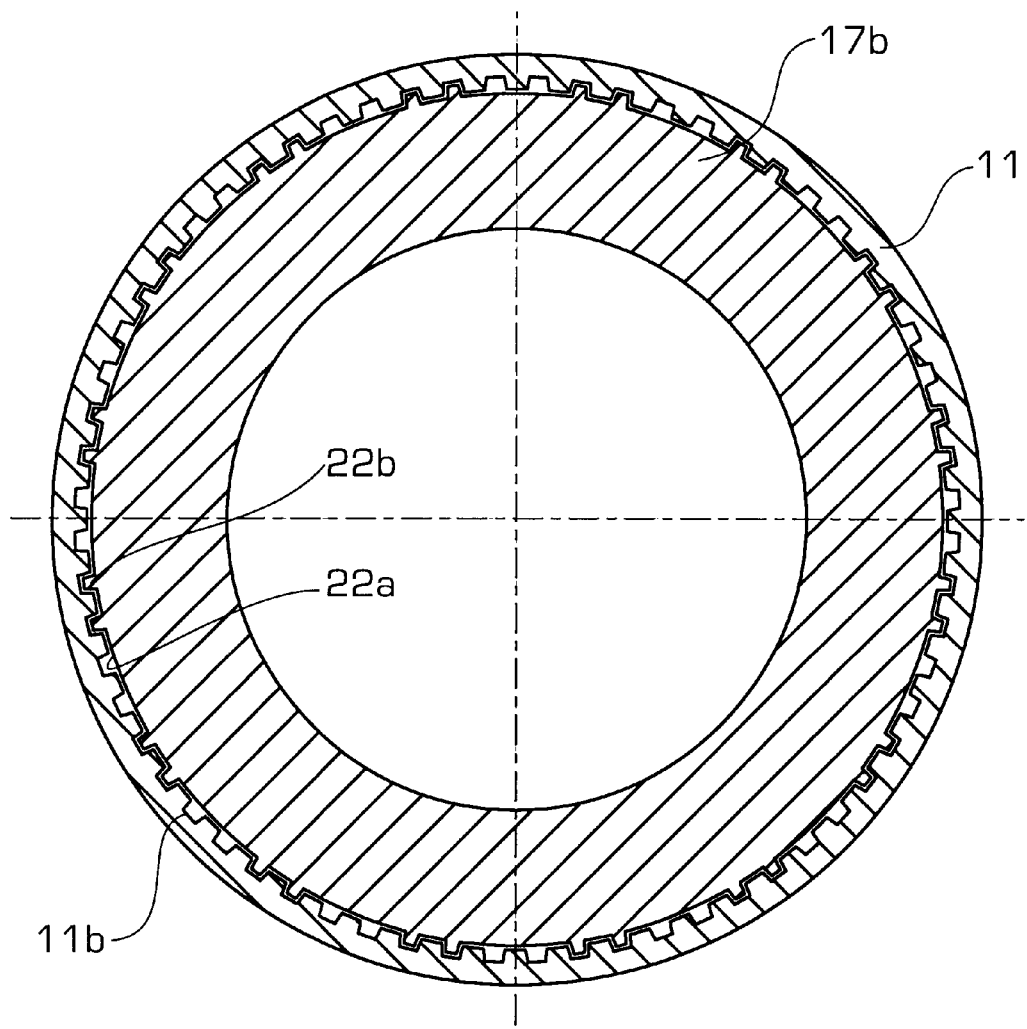
FIG. 2 is a view in section along the line II—II in FIG. 1, limited to the crown wheel and counter-disk.
Figure 3:
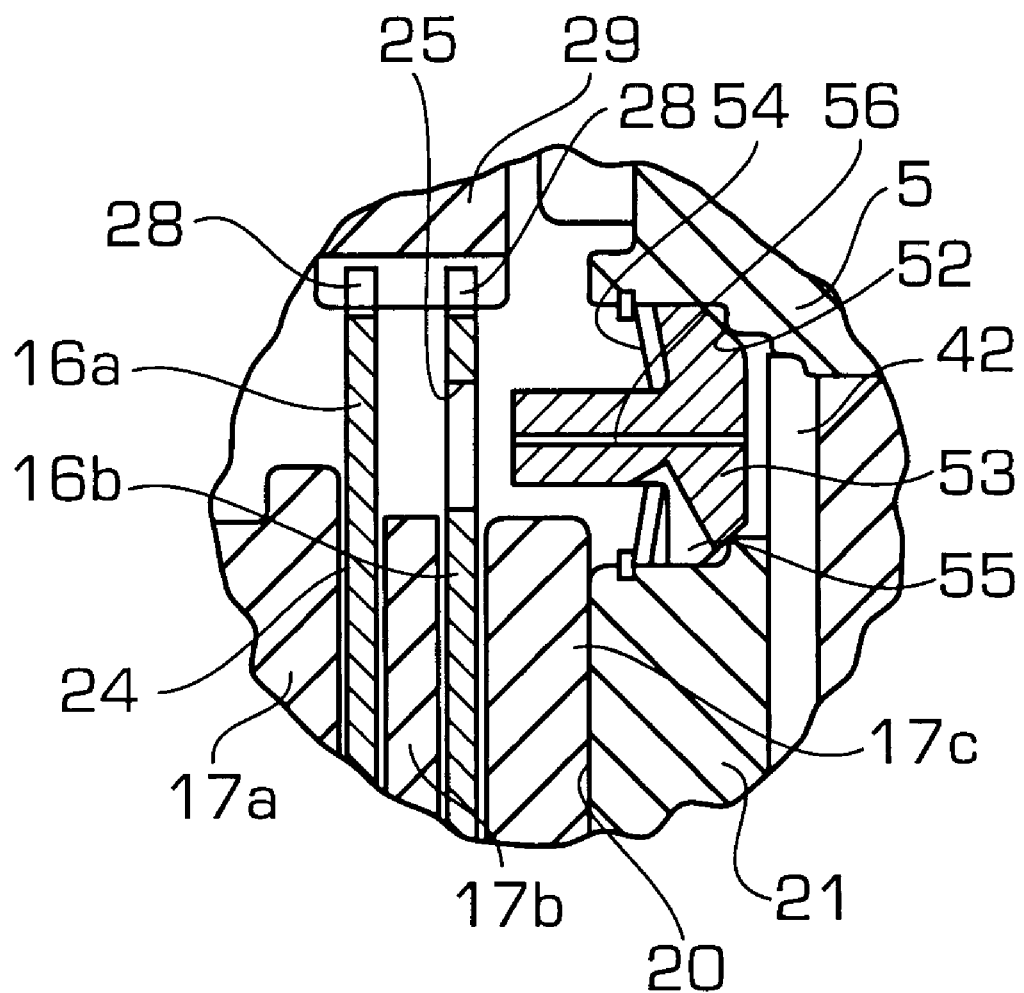
FIG. 3 is a view in section on an enlarged scale of the detail indicated by the arrow III in FIG. 1.
Figure 4:
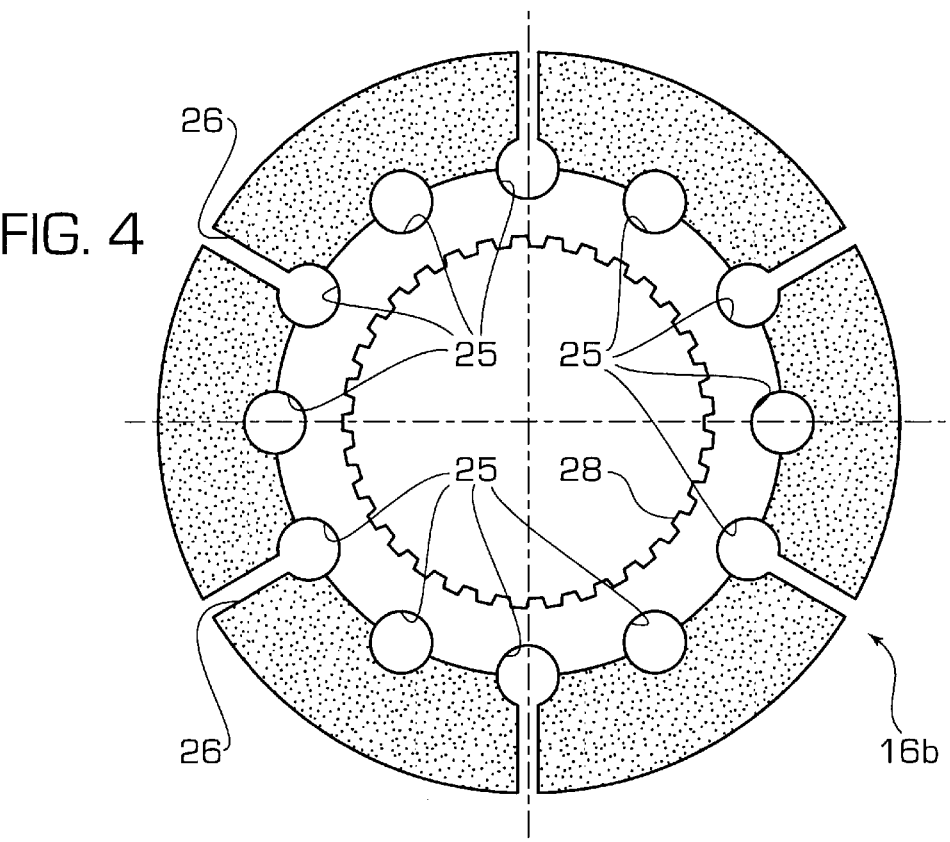
FIGS. 4 and 5 are views of details of the braking unit in FIG. 1.
Figure 5:
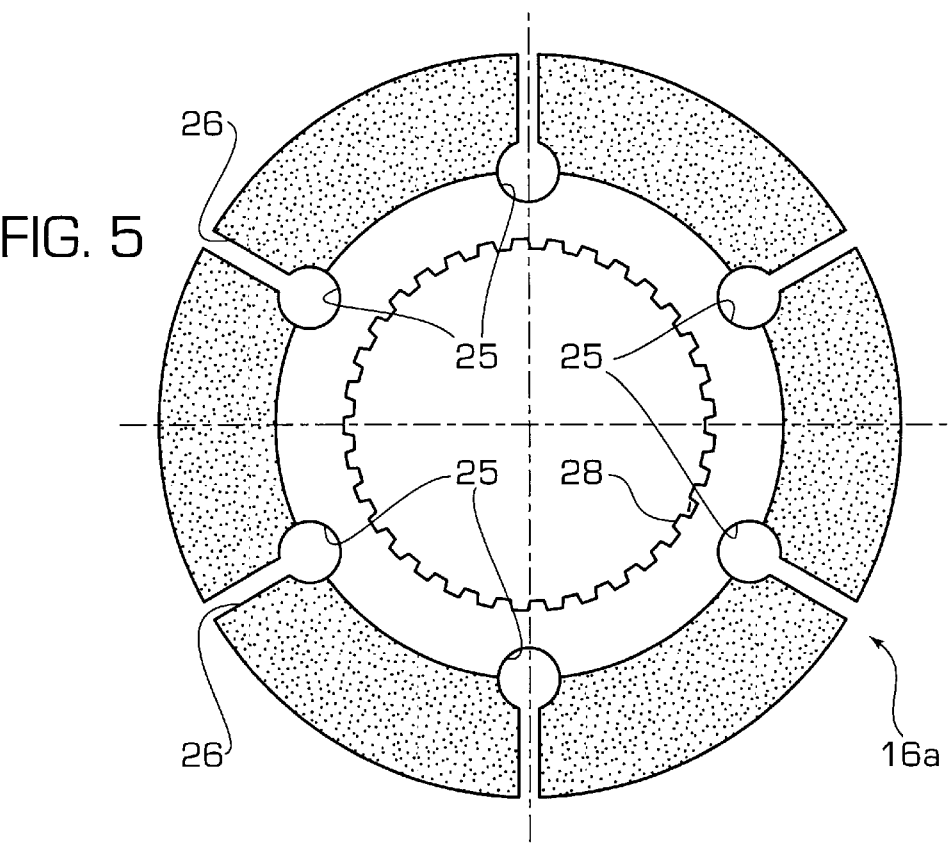

In FIG. 1, the reference 1 generally indicates a transmission for vehicles including a wheel hub 2 with a wheel-carrier flange 3 and a casing 4 which are rotatably supported on a stationary part 5 of the hub by way of bearings 6.

In the casing 4 there is housed an epicyclic reduction gear generally indicated 7 and a braking unit 10.

The reduction gear 7 comprises a crown wheel 11 with a first and a second internal set of teeth 11a, 11b, a sun gear 12 provided by toothing the terminal section of a shaft 13, and a plurality of planetary gears 14 supported on pins 14a which, with the casing 4, constitute the gear train carrier of the reduction gear 7. The gears 14 mesh with the sun gear 12 and with the first set of teeth 11a of the crown wheel 11.

The braking unit 10 comprises a braking pack 15 with disks 16a, 16b and counter-disks 17a, 17b, 17c and an actuating unit 18 arranged to compress the braking pack 15 on actuation of the brake.

In the example illustrated there is provided a braking pack with two single disks 16a, 16b and three counter-disks 17a–c, it being understood that the number of such components may be increased or reduced according to need and according to the braking power which it is wished to develop.

The first counter-disk 17a of the pack 15 is butted against a shoulder 19 between the sets of teeth 11a, 11b; the last counter-disk 17c is butted against an annular surface 20 of a radial flange 21 integral with the unit 18 and facing the braking pack 15. All the counter-disks 17a, 17b, 17c and the flange 21 carry an external circumferential set of teeth 22 meshing with the second set of teeth 11b of the crown wheel 11. The outer sets of teeth 22 are discontinuous, channel-like gaps 22a being provided between groups of contiguous teeth 22b for reasons which will be explained hereinafter.

The disks 16a, 16b carry friction linings 24 and have a plurality of through bores 25, some of which are intersected by radial apertures 26. It should be noted that the number of such bores is greater in the disk 16b closest to the flange 21 and becomes less as the distance from the latter increases in the direction of the epicyclic reduction gear 7.

The said disks 16a, 16b have internally a set of teeth 28 by way of which they are splined and driven in rotation on an annular adaptor 29 the internal toothing 30 of which is engaged on the teeth of the sun gear 12

The adaptor 29 is retained axially on the shaft 13 by means of two circlips 31a, 31b, the removal of which permits the removal of the adaptor 29 and easy access to screws 32 with which the actuating unit 18 is rigidly connected to the stationary part 5 of the hub 2.

In the same way, the crown wheel 11 is rigidly connected to the flange 21 of the actuating unit 18 and, by way of the latter, to the stationary part 5 of the hub 2, by means of a circlip 34 mounted close to the aforesaid flange 21.

Owing to these constructional devices and to those described subsequently in the following, the braking unit 10 of this invention constitutes a unit which can be handled individually, all its components being grouped together a stable manner. For this reason the unit 10 is subject to easy maintenance and is suitable for retrofitting operations, or operations for equipping axles arranged to receive it without the unit itself being fitted originally.

The actuating unit 18 comprises a single annular piston 40 slidingly mounted, sealed, in an annular cylinder 41 and defining together with the latter a first and a second annular chamber 42, 43. The first chamber is defined between the piston 40 and the surface facing it of the flange 21; the second chamber is comprised between the piston 40 and a cover 47 retained in position by a circlip 47c.

In the first chamber 42 there opens a feed and discharge duct 44 for oil or other pressurized actuating fluid, which extends in the body of the actuating unit and is extended into the stationary part 5 of the hub 2. The Is duct 44 can be selectively connected to a delivery duct 44a or to a discharge duct 44b by way of a valve 45.

In the second chamber 43 there opens a feed duct 46 for pressurized oil for service control of the brake when its intervention is required. In the same chamber 43 there is also placed a pack of springs 47a, 47b which constitute a resilient system acting on the braking pack, by way of the piston 40, in order to generate a braking load sufficient for parking braking.

The piston 40 acts on the counter-disk 17c by way of a plurality of appendages 48 respectively engaged in a sealed manner with their one shank 48a of smaller diameter in corresponding holes in the piston and with a part of larger diameter 48b in bushes 50 which are in turn inserted with a slight interference fit in holes 51 in the flange 21. The appendages 48 have a shoulder 46c capable of butting against the respective bush 50 in order to limit the return stroke of the piston 40 to the predetermined play (G) existing for the shorter axial length of the bush 50 with respect to the corresponding axial length of the section of larger diameter 48b of the appendage (equivalent to the distance between the shoulder 48c and the facing surface of the piston 40). These therefore constitute, together with the bushes 50, means for taking up the play resulting from wear of the friction linings 24 of the disks 16a, 16b.

In the flange 21 which delimits the bottom of the first chamber 42 there is also provided a through aperture in which is defined a valve seat 52 normally obstructed by an obturator 53. The obturator 53 is resiliently biased into closure of the said seat 52 by a springing system 54. In the obturator itself there is provided a radial passage 55 of predetermined size capable of allowing the rapid discharge of pressurized oil from the first chamber with a predetermined maximum capacity.

In the wall of the first chamber, and preferably in the obturator 53, there is also provided an axial duct 56 of calibrated diameter, capable of allowing tapping (by drawing through it) of a predetermined capacity of pressurized oil from the chamber 42. This continuous tapping of pressurized oil is used for the lubrication and cooling of the braking pack 15 and also for improving the lubrication of the epicyclic reduction gear 7. For this purpose the obturator 53 has an appendage 58 extended axially towards the braking pack 15 at a radial distance from the axes of the disks such that the duct 56 opens at the holes 25. The differing number of holes 25 as the distance from the flange 21 increases has the purpose of sub-dividing the capacity of lubricant available for the various friction surfaces of the brakes 16a, 16b, permitting, however, the passage of a fraction of the capacity of oil as far as the epicyclic reduction gear 7 for the lubrication of the latter. The radial apertures 26 permit the down-flow of the oil collected from the corresponding disc as far as the channel-like gaps 22a which facilitate its down-flow in an axial direction.

By effecting distribution of the lubrication by means of the holes 25 (as an alternative to their number, their diameter may be varied) it is possible to optimize the lubricating effect according to the braking power required, therefore reducing the mass of oil in circulation. By suitable regulation of the dimensions and numbers of the radial apertures 26 and of the channel-like gaps 22a it is possible to optimize the speed at which the oil passes through the braking pack and therefore to maximize the brake cooling effect.

For drainage of the oil from the casing 4, one or more ducts 60 are provided in the wheel-carrier flange 3 and a further duct 61 in the stationary part 5 of the hub. It should be noted that the ducts 60 are positioned radially outside the bearings 6 and that the distance between the duct 61 and the axis of the hub is the maximum admissible that is compatible with the structure of the stationary part 5. In this way, it is possible to minimize the level of oil inside the casing 4 and the consequent dispersion of power by "pumping" effects on the part of the gears of the epicyclic reduction gear 7 and of the rotating components of the braking unit 10.

The operation of the unit of this invention is as follows. When the vehicle on which the transmission 1 is installed has the engine switched off, the parking braking action is ensured by the resilient load generated on the piston 40 and, by way of this, on the braking pack of disks and counter-disks by the springs 47a, 47b. The braking torque is transmitted to the wheel by way of the epicyclic reduction gear 7.

With the engine switched on, or when wishing to release the parking brake, pressurized oil is fed to the first chamber 42. The supply pressure is selected so as to generate on the piston 40 a thrust greater than that exerted by the springs 47a, 47b and sufficient to overcome the residual pressure in the supply circuit of the second chamber 43 (service brake) in such a manner as to cause the volume of oil contained therein to flow away through the duct 46 towards a reservoir of the brake circuit.

An oil capacity proportional to the pressure existing in the first chamber, to the diameter of the duct 56 and to the viscosity of the oil is continuously sprayed through the said duct 56 onto the braking pack 15.

To actuate the service brake, pressurized oil is fed into the second chamber, while the first chamber remains supplied. When the combined thrust, determined in the second chamber 43 by the oil pressure and by the resilient action of the springs, exceeds the hydraulic thrust in the first chamber, the braking pack is compressed in a manner proportional to the pressure difference between the two chambers.

The response of the service brake is also linked to the viscosity (and consequently to the temperature) of the oil circulating in the first chamber. In order to render this factor uniform, the invention proposes to supply the second chamber with the lubricating oil of the transmission 1, for example in the case of a drive shaft, with the lubricating oil of the differential. This is maintained at a constant temperature of approximately 80° C. The continuous recirculation of oil coming from the transmission through the duct 56 therefore allows this problem to be solved.

In order to ensure an adequate response in emergency conditions (panic brake), the springing system 54 of the obturator 53 is calibrated to permit the opening of the valve seat 52 at a pressure of approximately 1 bar higher than the supply pressure of the first chamber 42. The opening of the valve 52, 53 in such a case allows a rapid down-flow of oil from the chamber 42 in conditions of rapid and violent actuation of the service brake.

With the engine switched on, the actuation of the parking brake is obtained by acting on the valve 45 so as to interrupt the supply of pressurized oil to the first chamber 42. If in this context the duct 44 is connected to discharge (duct 44b), there is relatively rapid intervention of the parking brake by the effect of the thrust exerted on the piston 40 by the springs 47a, 47b. If, instead, only the supply of the first chamber 42 is interrupted, the intervention of the parking brake is progressive and gradual, since the down-flow of the oil from the first chamber is obtained only by tapping through the duct 56.

Finally, in the case of actuation of the service brake, it is possible to switch the valve 45 to cancel out the supply of the first chamber, thus obtaining a braking effect increased by the combined thrust of the springs 47a, 47b and of the hydraulic pressure in the second chamber 43.

The invention thus achieves the objects proposed while at the same time obtaining further advantages. Among these is the fact that the brake is suitable for being supplied with the same oil provided for the lubrication of the transmission, it also being possible to use different oils for the supply of the two chambers, since there is hydraulic separation between the latter. It is moreover suitable to be constructed, stored and in general treated as a unit that can be handled individually, pre-assembled in the factory. The lubricating and cooling effect is moreover improved by also reducing the level of oil in the casing 4 and the consequent losses of power by the pumping effect. Finally, the brake is suitable for being integrated with an easy and effective system for taking up the play resulting from wear of the friction surfaces.

What is claimed is:

1. A braking unit comprising:
   a braking pack with disks and counter-disks;
   a resilient system acting on the said pack in order to compress the said disks and counter-disks with a braking load sufficient for parking braking,
   a first hydraulic system for exerting on the said resilient system a contrary load sufficient to cancel out the action of the said resilient system,
   a second hydraulic system acting on the said pack in order to compress the said disks and counter-disks with a braking load sufficient for service braking, characterized in that the said hydraulic systems comprise a single piston acting on one side on the said pack and on the other side on the said resilient system to exert the said respective loads,
   wherein the said piston slides in a cylinder, delimiting therein a first and a second chamber, and respective first and second ducts open in the said chambers for the operative control respectively of the said first and second hydraulic system, and wherein, in the said first chamber, drawing means open towards the outside of the first chamber are provided for controlled drawing from the said first chamber of a capacity of pressurized oil.

2. A unit according to claim 1, wherein the said valve means comprise a valve seat in a wall of the first chamber and an obturator biased by a springing system into normal closure of the said seat and capable of opening the said seat when the said predetermined pressure threshold is exceeded.

3. A unit according to claim 1 wherein the said drawing means comprise a calibrated bore extending from the said first chamber and directed against the said pack of disks and counter-disks for the cooling and lubrication of the latter.

4. A unit according to claim 3, wherein the said bore is provided in the said obturator.

5. A unit according to claim 1 wherein on the said disks there ar provided passages open at the said drawing means to receive on a first disk a fraction of the oil capacity which is drawn from the said first chamber and to allow the passage of the remaining fraction of the capacity onto an adjacent disk.

6. A unit according to claim 5, wherein the said passages have a combined section decreasing in a direction away from the said drawing means.

7. A unit according to claim 6, wherein the said passages are constituted by bores passing through each disk and the number or diameter of which decreases in a direction away from the said drawing means.

8. A unit according to claim 1, wherein, at the periphery of the said counter-disks, there are channel-like gaps for the down-flow of oil from the said braking pack.

9. A unit according to claim 1 wherein, between the said piston and the said braking pack, means are provided for taking up play resulting from wear of friction surfaces of the said pack.

10. A braking unit comprising:
    a braking pack with disks and counter-disks;
    a resilient system acting on the said pack in order to compress the said disks and counter-disks with a braking load sufficient for parking braking,
    a first hydraulic system for exerting on the said resilient system a contrary load sufficient to cancel out the action of the said resilient system,
    a second hydraulic system acting on the said pack in order to compress the said disks and counter-disks with a braking load sufficient for service braking, characterized in that the said hydraulic systems comprise a single piston acting on one side on the said pack and on the other side on the said resilient system to exert the said respective loads,
    wherein the said piston slides in a cylinder, delimiting therein a first and a second chamber, and respective first and second ducts open in the said chambers for the operative control respectively of the said first and second hydraulic system, and
    wherein, in the said first chamber, valve means open towards the outside of the first chamber are provided for the rapid discharge of pressurized oil from the said first chamber when a predetermined pressure threshold is exceeded.

* * * * *